US009579705B2

(12) United States Patent
 Park et al.

(10) Patent No.: US 9,579,705 B2
(45) Date of Patent: Feb. 28, 2017

(54) WATER PIPE FOR WHICH HYDROFORMING IS EMPLOYED, AND A PRODUCTION METHOD THEREFOR

(71) Applicant: HYUNDAI STEEL COMPANY, Incheon (KR)

(72) Inventors: Sung-Pill Park, Ulsan (KR); Kyung-Soo Jin, Ulsan (KR); Yun-Gyu Kim, Ulsan (KR); Man-Been Moon, Guri-si (KR)

(73) Assignee: HYUNDAI STEEL COMPANY, Incheon (KR)

( * ) Notice: Subject to any disclaimer, the term of this patent is extended or adjusted under 35 U.S.C. 154(b) by 8 days.

(21) Appl. No.: 14/536,066

(22) Filed: Nov. 7, 2014

(65) Prior Publication Data

US 2015/0114064 A1    Apr. 30, 2015

Related U.S. Application Data

(62) Division of application No. 13/502,466, filed as application No. PCT/KR2010/002176 on Apr. 8, 2010, now Pat. No. 9,101,972.

(30) Foreign Application Priority Data

Nov. 12, 2009    (KR) .................. 10-2009-0108969

(51) Int. Cl.
 *B21D 26/035*    (2011.01)
 *B21D 26/051*    (2011.01)
 (Continued)

(52) U.S. Cl.
 CPC .......... *B21D 26/051* (2013.01); *B21C 37/154* (2013.01); *B21D 26/033* (2013.01);
 (Continued)

(58) Field of Classification Search
 CPC .. B21D 26/033; B21D 26/045; B21D 26/051; B21D 37/154; B21D 39/04;
 (Continued)

(56) References Cited

U.S. PATENT DOCUMENTS 4,210,991 A * 7/1980 Cooper, Jr. ............ B21D 39/06
 29/421.1
5,363,544 A * 11/1994 Wells .................... B21C 37/154
 138/114

(Continued)

FOREIGN PATENT DOCUMENTS

JP    0473486 A    3/1992
JP    05-240377 A    9/1993
 (Continued)

OTHER PUBLICATIONS

Japanese Office Action dated Jul. 1, 2014.
International Search Report for PCT/KR2010/002176 mailed on Dec. 28, 2010.

*Primary Examiner* — Edward Tolan
(74) *Attorney, Agent, or Firm* — Hauptman Ham, LLP

(57) ABSTRACT

Disclosed are a double water pipe manufactured via hydroforming and a method of manufacturing the same. The method includes: inserting an inner pipe into an outer pipe made of steel, the inner pipe being made of a corrosion resistant material selected from among stainless steel, titanium and aluminum, and having a smaller outer diameter than an inner diameter of the outer pipe; placing the outer pipe on a die unit and sealing opposite ends of the die unit with sealing members each having a through-hole connected to a fluid supply unit for supplying a fluid to the inner pipe; supplying the fluid to the inner pipe to perform plastic expansion of the inner pipe and elastic expansion of the outer pipe; and discharging the fluid from the inner pipe to allow frictional coupling between the inner pipe and the outer pipe through elastic restoration of the outer pipe.

6 Claims, 4 Drawing Sheets

Fig. 3

(51) Int. Cl.
*B21C 37/15* (2006.01)
*B21D 26/033* (2011.01)
*B21D 39/04* (2006.01)
*F16L 9/04* (2006.01)
*F16L 58/08* (2006.01)
*B21D 35/00* (2006.01)
*B21D 51/16* (2006.01)

(52) U.S. Cl.
CPC .......... *B21D 26/035* (2013.01); *B21D 35/002* (2013.01); *B21D 39/04* (2013.01); *B21D 51/16* (2013.01); *F16L 9/04* (2013.01); *F16L 58/08* (2013.01); *Y10T 29/49805* (2015.01)

(58) Field of Classification Search
CPC ....... B21D 26/035; B21D 26/049; F16L 9/04; F16L 9/147; F16L 9/18; Y10T 29/49805; B21C 37/154
See application file for complete search history.

(56) References Cited

U.S. PATENT DOCUMENTS

| | | | | |
|---|---|---|---|---|
| 5,958,602 | A * | 9/1999 | Usui | B21C 37/06 138/142 |
| 6,254,488 | B1 * | 7/2001 | Hill | B21D 26/051 464/180 |
| 6,497,030 | B1 * | 12/2002 | Marando | B21D 15/10 29/419.2 |
| 6,609,301 | B1 * | 8/2003 | Morris | B21D 26/051 29/421.1 |
| 8,281,476 | B2 * | 10/2012 | Hur | B21D 26/02 29/421.1 |
| 2006/0005393 | A1 * | 1/2006 | Wagner | B21D 26/033 29/897.2 |
| 2006/0108783 | A1 * | 5/2006 | Ni | B21D 26/051 280/781 |
| 2009/0173408 | A1 | 7/2009 | Mimura et al. | |

FOREIGN PATENT DOCUMENTS

| | | | |
|---|---|---|---|
| JP | 07214153 | A | 8/1995 |
| JP | 07214345 | A | 8/1995 |
| JP | 10052721 | A | 2/1998 |
| JP | 10137863 | A | 5/1998 |
| JP | 11005125 | A | 1/1999 |
| JP | 2001321844 | A | 11/2001 |
| JP | 2002331319 | A | 11/2002 |
| JP | 2004073486 | A | 3/2004 |
| JP | 2006315010 | A | 11/2006 |
| JP | 2010052721 | A | 3/2010 |
| KR | 10-0401761 | B1 | 10/2003 |
| KR | 20-0385772 | Y1 | 6/2005 |
| WO | 2007139228 | | 12/2007 |
| WO | 2007139228 | A1 | 12/2007 |

* cited by examiner

WATER PIPE FOR WHICH HYDROFORMING IS EMPLOYED, AND A PRODUCTION METHOD THEREFOR

CROSS-REFERENCE TO RELATED APPLICATIONS

The present application is a Divisional Application of U.S. Ser. No. 13/502,466 filed Apr. 17, 2012, which is a National Phase application of International application number PCT/KR2010/002176 filed on Apr. 8, 2010, which is incorporated by reference in its entirety as set forth in full.

TECHNICAL FIELD

The present invention relates to water pipes for waterworks, drainage, fire protection, and the like. More particularly, the present invention relates to a water pipe, which includes an outer pipe and an inner pipe coupled to each other to form a double-pipe structure through hydroforming, and a method of manufacturing the same.

BACKGROUND ART

Water pipes refer to pipes, such as pipes for waterworks, drainage, fire protection, and the like, through which water is transferred.

Typical water pipes are generally prepared using steel pipes. However, since water flows through the water pipe, a steel-based water pipe inevitably suffers from corrosion of an inner surface thereof.

To solve such a problem, highly corrosion-resistant materials, such as aluminum, stainless steel, and the like, are often used for water pipes but have problems in terms of high cost and low strength. Further, a pipe coated with a highly corrosion resistant material on an inner surface thereof can be used for water pipes but suffers from easy separation of the coated material according to use conditions.

Thus, in consideration of manufacturing cost, corrosion resistance, outer strength, and the like, there is a need for a double water pipe, in which an inner side of the water pipe is coated with a corrosion resistant material such as aluminum, stainless steel, or the like, and an outer side of the water pipe is formed of typical steel.

Generally, such a double water pipe may be manufactured using a bonding agent filling process or a shrink fitting process.

In the bonding agent filling process, a bonding agent or synthetic resin is provided to a space between the inner pipe and the outer pipe to couple the inner pipe to the outer pipe. This process has a problem in that performance of coupling the inner pipe and the outer pipe is deteriorated due to chemical variation of the bonding agent or synthetic resin according to temperature or other conditions.

Further, the shrink fitting process refers to a method of heating or cooling the inner pipe or the outer pipe. In the method of manufacturing a double pipe via the shrink fitting process, expensive heat treatment equipment is used and a long double pipe cannot be manufactured to have a uniform bonding surface only through heat treatment.

Therefore, there is a need for a technique for manufacturing a water pipe of a double-pipe structure while providing excellent coupling performance and ensuring uniform bonding at a bonded interface.

DISCLOSURE

Technical Problem

An aspect of the present invention is to provide a method of manufacturing a double water pipe using hydroforming, which may secure corrosion resistance of an inner surface and impact strength of an outer surface.

Another aspect of the present invention is to provide a double water pipe manufactured using hydroforming.

Technical Solution

In accordance with one aspect of the present invention, a method of manufacturing a double water pipe using hydroforming includes: (a) inserting an inner pipe into an outer pipe made of steel, the inner pipe being made of a corrosion resistant material selected from among stainless steel, titanium and aluminum and having a smaller outer diameter than an inner diameter of the outer pipe; (b) placing the outer pipe on a die unit and sealing opposite ends of the die unit with sealing members each having a through-hole connected to a fluid supply unit for supplying a fluid to the inner pipe; (c) supplying the fluid to the inner pipe to perform plastic expansion of the inner pipe and elastic expansion of the outer pipe; and (d) discharging the fluid from the inner pipe to allow frictional coupling between the inner pipe and the outer pipe through elastic restoration of the outer pipe.

In accordance with another aspect of the present invention, a double water pipe includes an outer pipe made of steel; and an inner pipe made of a corrosion resistant material selected from among stainless steel, titanium and aluminum, and inserted into the outer pipe to be frictionally coupled to the outer pipe by hydroforming.

Advantageous Effects

In the method of manufacturing a double water pipe using hydroforming according to the present invention, the water pipe is manufactured by hydroforming, in which inner and outer pipes are subjected to plastic and elastic expansion by hydraulic pressure. Accordingly, it is possible to achieve uniform bonding between overall bonding surfaces while providing excellent coupling performance.

In addition, in a double water pipe according to the present invention, the interior of the water pipe is made of a highly corrosion resistant material, thereby improving lifespan of the water pipe under conditions in which water continues to flow therethrough.

Further, in the double water pipe according to the present invention, the exterior of the water pipe is made of typical steel, thereby preventing damage of the water pipe from impact applied thereto.

BEST MODE

Exemplary embodiments of the present invention will now be described in detail with reference to the accompanying drawings.

It should be noted that the drawings are not to precise scale and may be exaggerated in thickness of lines or size of components for descriptive convenience and clarity only.

Furthermore, the terms used herein are defined by taking functions of the present disclosure into account and can be changed according to the custom or intention of users or operators.

Therefore, definition of the terms should be made according to the overall disclosure set forth herein.

Figure 1:
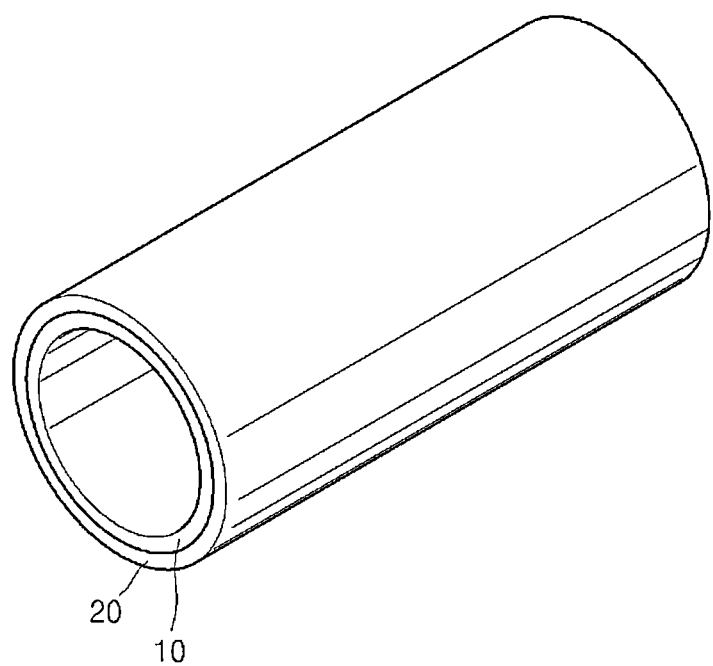
FIG. 1 is a perspective view of a double water pipe, which is manufactured using hydroforming, in accordance with one exemplary embodiment of the present invention.

FIG. 1 is a perspective view of a double water pipe, which is manufactured using hydroforming, in accordance with one exemplary embodiment.

Referring to FIG. 1, the double water pipe has a double pipe structure in which an inner pipe 10 is coupled to an outer pipe 20.

The inner pipe 10 is made of a highly corrosion resistant material such as stainless steel, titanium, and aluminum to improve corrosion resistance.

The outer pipe 20 constitutes an outer appearance of the water pipe and is made of steel which has high impact resistance. The outer pipe 20 may be made of a plated steel pipe, such as galvanized steel pipe, aluminum-plated steel pipe, etc. Alternatively, the outer pipe may be made of a non-plated steel pipe.

The inner pipe 10 is coupled to the outer pipe 20 via hydroforming. In the hydroforming process, hydraulic pressure of fluid is used to couple the inner pipe 10 and the outer pipe 20 through plastic expansion of the inner pipe 10 and elastic expansion of the outer pipe 20. In this process, the inner pipe 10 is mechanically coupled to the outer pipe 20 without using a separate bonding agent or welding.

Figure 2:
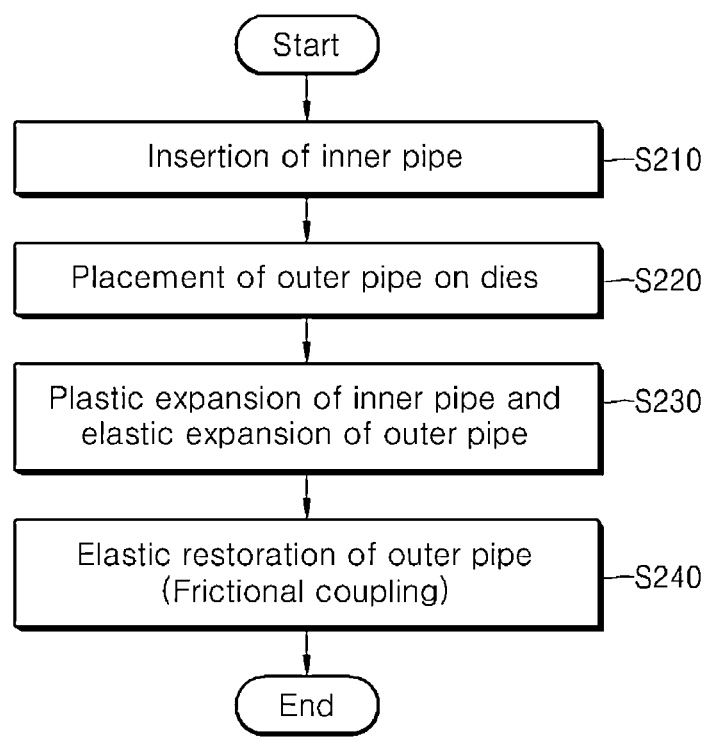
FIG. 2 is a flowchart of a method of manufacturing a water pipe using hydroforming in accordance with one exemplary embodiment of the present invention.

FIG. 2 is a flowchart of a method of manufacturing a water pipe using hydroforming in accordance with one exemplary embodiment of the invention.

Referring to FIG. 2, the method of manufacturing a double water pipe includes: inserting an inner pipe (S210), placing an outer pipe on a die unit (S220), performing plastic expansion of the inner pipe and elastic expansion of the outer pipe (S230), and elastically restoring the outer pipe (S240).

In the operation of inserting an inner pipe (S210), the inner pipe is inserted into an outer pipe having a certain inner diameter. Here, the inner pipe has a smaller outer diameter than an inner diameter of the outer pipe.

Since the inner pipe contacts water inside the water pipe, the inner pipe may be formed of a highly corrosion resistant material, such as stainless steel, titanium, aluminum, and the like.

The outer pipe constitutes an outer appearance of the water pipe and may be made of steel, such as plated steel pipe, non-plated steel pipe, and the like, which have high impact resistance.

In order to allow the inner pipe to be inserted into the outer pipe, the inner pipe has a smaller outer diameter than the inner diameter of the outer pipe. The ratio of the outer diameter of the inner pipe to the inner diameter of the outer pipe may be set according to a threshold expansion rate between elastic expansion and plastic expansion of the inner pipe.

The outer diameter of the inner pipe may be approximately 95-98% of the inner diameter of the outer pipe. If the outer diameter of the inner pipe is less than 95% of the inner diameter of the outer pipe, the inner pipe is likely to excessively expand, causing failure such as bursting or damage. On the other hand, if the outer diameter of the inner pipe is greater than 98% of the inner diameter of the outer pipe, shrinkage of the outer pipe becomes severe upon removal of hydraulic pressure, thereby making it difficult to secure suitable coupling strength.

Further, in order to maintain high coupling strength between the inner and outer pipes via hydroforming, surface roughness may be imparted to the inner surface of the outer pipe and the outer surface of the inner pipe which are brought into direct frictional contact with each other.

On the other hand, before frictional coupling between the inner pipe and the outer pipe via hydroforming, the outer surface of the inner pipe and the inner surface of the outer pipe may be subjected to surface treatment for cleaning. For example, the inner surface of the outer pipe may be subjected to shot blasting and the outer surface of the inner pipe may be subjected to pickling, without being limited thereto.

In the operation of placing the outer pipe on the die unit (S220), the outer pipe is placed on the die unit and both ends of the die unit are sealed by sealing members. Here, the inner pipe may be inserted into the outer pipe before or after placing the outer pipe on the die unit.

In this operation, the inner pipe is coaxially aligned with the outer pipe. This alignment enables uniform expansion of the inner and outer pipes in all thickness directions during the operation of performing plastic expansion of the inner pipe and elastic expansion of the outer pipe (S230).

Each of the sealing members is provided with a through-hole connected to a fluid supply unit, which supplies fluid to the inner pipe. The fluid is supplied from the fluid supply unit to the inner pipe through the through-holes.

In the operation of performing plastic expansion of the inner pipe and elastic expansion of the outer pipe (S230), the fluid such as water is supplied from the fluid supply unit through the through-holes formed in the sealing members to expand the inner pipe. Here, expansion may be classified into elastic expansion and plastic expansion. For elastic expansion, the inner pipe recovers to an original state upon release of pressure, whereas the inner does not recovers to the original state even after release of pressure.

For the inner pipe, at an initial stage, elastic expansion occurs by hydraulic pressure, and when the inner pipe expands over a certain expansion rate, plastic expansion occurs, so that the inner pipe remains in an expanded state even after the hydraulic pressure is released.

As the inner pipe expands and is brought into contact with the outer pipe, the outer pipe expands together with the inner pipe. At this time, the inner pipe expands until plastic deformation occurs, and the outer pipe undergoes elastic expansion due to restriction of the expansion rate by the die unit.

Here, the fluid may be supplied to the inner pipe, with a dummy member inserted into the inner pipe.

The dummy member occupies a certain volume within the inner pipe, so that an available space of the inner pipe is substantially reduced, thereby providing effects of reducing the amount of fluid and time for supplying the fluid upon hydroforming. If the dummy member is not provided to the inner pipe, the inner pipe starts to expand after the space of the inner pipe is completely filled with the fluid, whereas, if the dummy member is inserted into the inner pipe, the interior of the inner pipe is substantially reduced by the volume of the dummy member. As a result, the amount of fluid to be supplied is reduced by the volume occupied by the dummy member. This configuration is more effective when a water pipe to be manufactured has a large diameter of 400 mm or more.

Here, the dummy member may be prepared using any material, such as metal rod, plastic rod, foam resin (Styrofoam), and the like, without being limited thereto.

In the operation of elastically restoring the outer pipe (S240), the fluid is discharged from the inner pipe to lower the pressure inside the inner pipe.

Even when the pressure of the fluid is released, the inner pipe, which has been subjected to plastic expansion, is not changed in size. However, the outer pipe is elastically restored to an original size thereof as the hydraulic pressure is released. At this time, the outer pipe is coupled to the inner pipe through friction between the inner surface of the outer pipe and the outer surface of the inner pipe.

Figure 3:
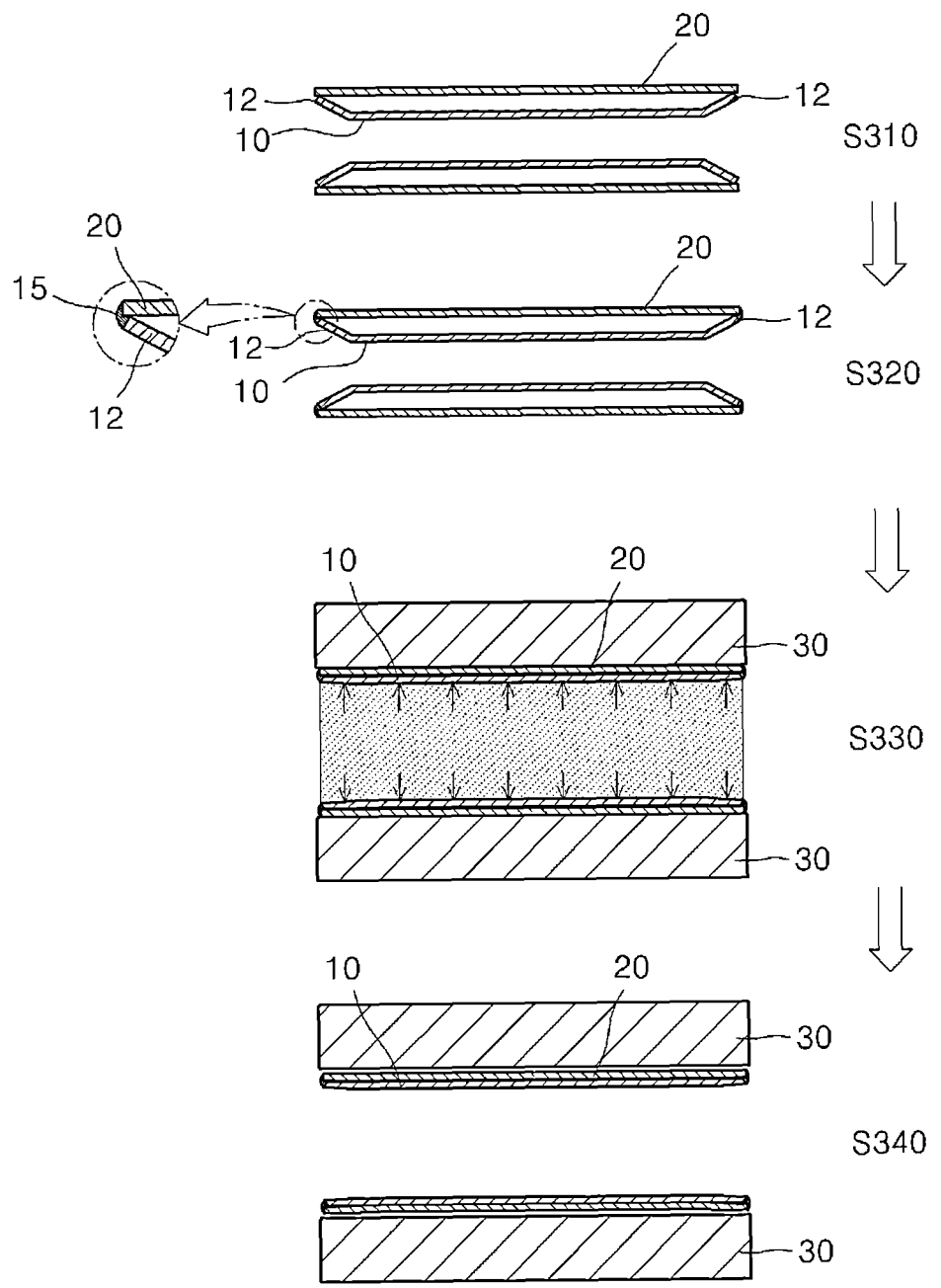
FIG. 3 is a flow diagram of modification of the method of manufacturing a water pipe using hydroforming in accordance with the exemplary embodiment of the present invention.

FIG. 3 is a flow diagram of modification of the method of manufacturing a water pipe via hydroforming in accordance with the present invention. Specifically, FIG. 3 shows the method of manufacturing a water pipe without separately aligning the inner pipe with the outer pipe before the operation of performing plastic expansion of the inner pipe and elastic expansion of the outer pipe (S230) in FIG. 2.

Referring to FIG. 3, the method further includes enlarging opposite ends of the inner pipe (S310) and welding the inner pipe to the outer pipe (S320).

First, in the operation of enlarging opposite ends of the inner pipe (S310), the opposite ends of the inner pipe 10 are enlarged using a jig or the like to be brought into close contact with the outer pipe.

As the opposite ends of the inner pipe 10 are enlarged to be brought into close contact with the outer pipe, the inner pipe 10 is coaxially aligned with the outer pipe 20 and subsequent processes may be carried out, with only the outer pipe 20 secured to the die unit.

Next, in the operation of welding the inner pipe to the outer pipe (S320), the enlarged opposite ends 12 of the inner pipe 10 are welded to the outer pipe 20 such that the inner pipe 10 is firmly secured to the outer pipe 20.

Here, a welded part 15 may be formed on part of the welded ends of the inner and outer pipes instead of being formed on the entire region of the welded ends thereof, such that air or foreign matter can be discharged to the outside through a non-welded part during expansion of the inner pipe in the subsequent operation of hydroforming (S330).

By the operation of hydroforming (S320), the enlarged opposite ends of the inner pipe 10 are firmly secured to the outer pipe 20 by welding, thereby allowing the inner pipe 10 and the outer pipe 20 to be kept in an aligned state. Accordingly, when manufacturing a double water pipe using the die unit 30, it is possible to eliminate the separate operation for aligning the inner and outer pipes 10, 20.

Here, the hydroforming operation (S330) includes the operation of performing plastic expansion of the inner pipe and elastic expansion of the outer pipe (S230) and the operation of elastically restoring the outer pipe (S240) in FIG. 2. Specifically, in the hydroforming operation, a fluid is provided into the inner pipe 10 to form the inner pipe 10 to be brought into close contact with the outer pipe 20, and then the outer pipe 20 is formed to be brought into close contact with the die unit 30.

As the fluid is injected into the inner pipe 10, the inner pipe 10 expands and comes into close contact with the outer pipe 20. As the pressure of the fluid, that is, hydraulic pressure, is constantly applied to the inner pipe 10, the outer pipe 20 also expands together with the inner pipe 10, so that the inner pipe 10 is brought into close contact with the outer pipe 20 and then the outer pipe 20 is also brought into close contact with the die unit 30.

After hydroforming, the method may further include end-cutting (S340) to cut opposite ends of the manufactured double water pipe in order to remove the welded part 15 between the inner pipe 10 and the outer pipe 20.

In another modification of the method of manufacturing a double water pipe, the outer pipe is formed with a discharge orifice.

At least one discharge orifice may be formed by punching the outer pipe, and serves as a passage through which air and foreign matter can be discharged from the inner pipe upon expansion of the inner pipe by hydraulic pressure.

The discharge orifice may be sealed again by welding or the like after manufacturing the double water pipe.

Here, the discharge orifice may have a diameter ranging from 5 to 10 mm. If the diameter of the discharge orifice is less than 5 mm, it is difficult for the discharge orifice to discharge foreign matter therethrough, and if the diameter of the discharge orifice is greater than 10 mm, it is difficult to seal the discharge orifice again.

Figure 4:
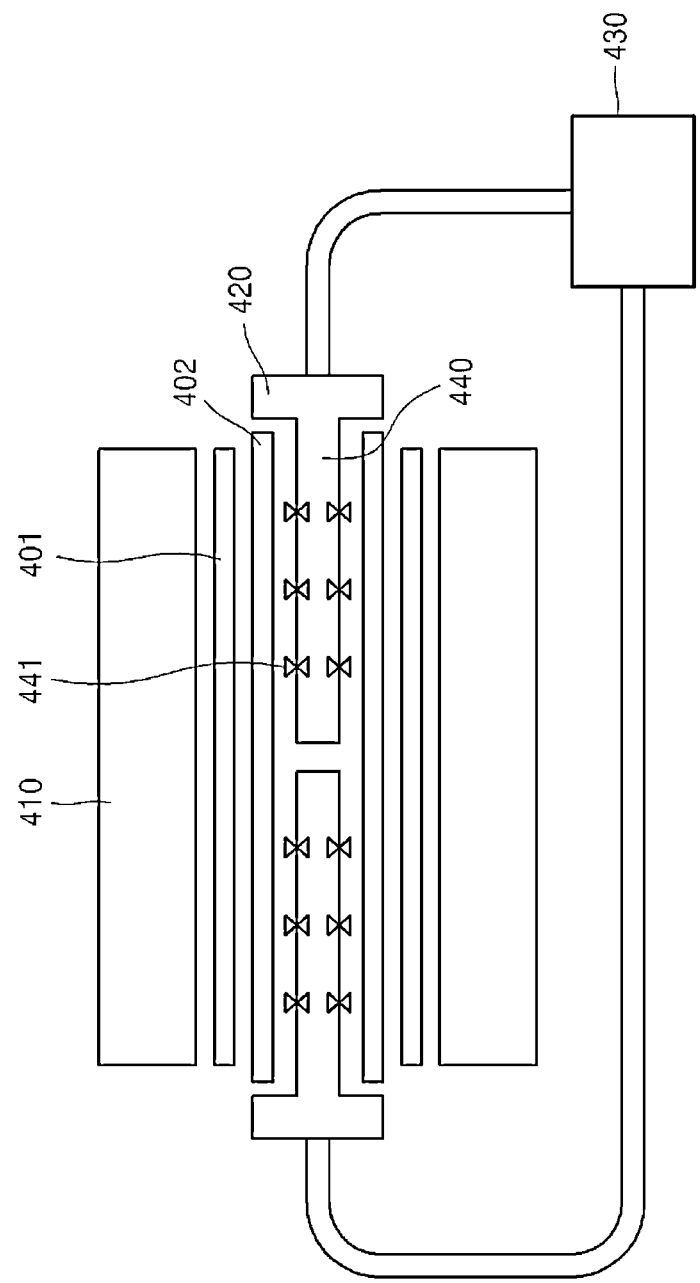
FIG. 4 is a diagrammatic sectional view of an apparatus for manufacturing a double water pipe via hydroforming in accordance with one exemplary embodiment of the present invention.

FIG. 4 is a diagrammatic sectional view of an apparatus for manufacturing a double water pipe via hydroforming in accordance with one exemplary embodiment of the present invention.

Referring to FIG. 4, the apparatus for manufacturing a double water pipe using hydroforming includes a die unit 410, a dummy member 430, and a fluid supply unit 430.

The die unit 410 is formed with a shaping groove, on which an outer pipe 401 is placed. Then, an inner pipe 402 is inserted into the outer pipe 401. The inner pipe 402 may be inserted into the outer pipe 401 before or after the outer pipe 401 is placed on the die unit 410.

A sealing member 420 is used to seal either end of the die unit 410 and is formed with a through-hole, through which fluid is supplied from the fluid supply unit 430 to the die unit 410.

The fluid supply unit 430 supplies the fluid to the inner pipe 402 through one or both sealing members 420 at both ends of the die unit, as shown in FIG. 4. When the fluid continues to be supplied into the inner pipe 402 from the fluid supply unit 430, the inner pipe 402 starts to be expanded by hydraulic pressure from when the inner pipe 402 is fully filled with the fluid, and is then finally coupled to the outer pipe 401 through plastic expansion of the inner pipe 402.

Here, the apparatus for manufacturing the double water pipe may further include a dummy member 440 as shown in FIG. 4.

The dummy member 440 is disposed inside the inner pipe 402 and substantially reduces the interior volume of the inner pipe 402. The dummy member 440 prepared using any volumetric material, such as metal rod, plastic rod, Styrofoam, and the like, without being limited thereto. The dummy member 440 serves to reduce the amount of fluid and time for supplying the fluid from the fluid supply unit 430.

Here, as shown in FIG. 4, the dummy member 440 may have a rod shape and be integrally formed with the sealing member 420. Further, the dummy member 440 is provided with a plurality of shut-off valves 441, which are opened during hydroforming and closed after hydroforming.

As described above, for the double water pipe manufactured via hydroforming according to the embodiments of the invention, the interior of the pipe is made of a highly corrosion resistant material, thereby improving lifespan of the pipe even under conditions that water continues to flow therethrough. Further, the exterior of the pipe is made of plated or non-plated steel, thereby preventing damage of the pipe even upon impact thereto.

In addition, according to the embodiments, hydroforming is used in manufacture of the water pipe, thereby improving coupling performance between the inner pipe having high corrosion resistance and the outer pipe having high impact resistance. Further, according to the embodiments, the water pipe is manufactured via hydroforming, enabling uniform coupling throughout a joined interface.

Although the present invention has been described with reference to some exemplary embodiments in conjunction with the drawings, it should be understood that these embodiments are given by way of illustration only and do not limit the scope of the invention, and that various modifications, variations, and alterations can be made by a person having ordinary knowledge in the art without departing from the spirit and scope of the invention.

Therefore, the scope of the invention should be limited only by the accompanying claims and equivalents thereof.

The invention claimed is:

1. A method of manufacturing a double water pipe using hydroforming, the method comprising:
    inserting an inner pipe into an outer pipe made of steel, the inner pipe being made of a corrosion resistant material selected from among stainless steel, titanium and aluminum, and having a smaller outer diameter than an inner diameter of the outer pipe;
    enlarging opposite ends of the inner pipe, with the inner pipe inserted into the outer pipe;
    welding the enlarged opposite ends of the inner pipe to the outer pipe;
    placing the outer pipe on a die unit and sealing opposite ends of the die unit with sealing members, each seal member having a through-hole connected to a fluid supply unit for supplying a fluid to the inner pipe;
    supplying the fluid to the inner pipe to perform plastic expansion of the inner pipe and elastic expansion of the outer pipe;
    discharging the fluid from the inner pipe to allow frictional coupling between the inner pipe and the outer pipe through elastic restoration of the outer pipe; and
    cutting opposite ends of the double water pipe to remove the welded enlarged opposite ends after discharging the fluid from the inner pipe,
    wherein each of an inner surface of the outer pipe and an outer surface of the inner pipe includes a rough surface which maintains the frictional coupling of the outer pipe with the inner pipe.

2. The method of claim 1, wherein supplying the fluid to the inner pipe, comprises:
    supplying the fluid the inner pipe with a dummy member inserted into the inner pipe.

3. The method of claim 2, wherein
    the dummy member is provided with a plurality of shut-off valves and is integrally formed with the sealing members, and
    the fluid is supplied to the inner pipe when the plurality of shut-off valves is opened.

4. The method of claim 1, wherein the welding of the enlarged opposite ends of the inner pipe comprises partially welding the opposite ends of the inner pipe to the outer pipe such that air and foreign matter are discharged through a non-welded portion between the inner and outer pipes during expansion of the inner pipe.

5. The method of claim 1, wherein the outer pipe is formed with a discharge orifice through which air and foreign matter are discharged upon expansion of the inner pipe.

6. The method of claim 1, wherein elastic expansion of the outer pipe occurs at an expansion rate restricted by the die unit.

* * * * *